US011474030B2

United States Patent
Viklund et al.

(10) Patent No.: US 11,474,030 B2
(45) Date of Patent: Oct. 18, 2022

(54) DYNAMIC DETERMINATION OF RADIOMETRIC VALUES USING MULTIPLE BAND SENSOR ARRAY SYSTEMS AND METHODS

(71) Applicant: FLIR Systems AB, Täby (SE)

(72) Inventors: Henrik Viklund, Taby (SE); Jonas Sandsten, Lomma (SE)

(73) Assignee: FLIR Systems AB, Taby (SE)

( * ) Notice: Subject to any disclaimer, the term of this patent is extended or adjusted under 35 U.S.C. 154(b) by 175 days.

(21) Appl. No.: 16/911,328

(22) Filed: Jun. 24, 2020

(65) Prior Publication Data
US 2020/0326276 A1    Oct. 15, 2020

Related U.S. Application Data

(63) Continuation of application No. PCT/US2018/067334, filed on Dec. 21, 2018.
(Continued)

(51) Int. Cl.
*G01N 21/3504*    (2014.01)
*G01J 5/00*    (2022.01)
(Continued)

(52) U.S. Cl.
CPC ........ *G01N 21/3504* (2013.01); *G01J 5/0014* (2013.01); *G06T 7/254* (2017.01);
(Continued)

(58) Field of Classification Search
CPC .......... G01J 5/0014; G01N 2021/3522; G01N 2021/3531; G01N 21/3504; H04N 5/33; G06T 7/254
See application file for complete search history.

(56) References Cited

U.S. PATENT DOCUMENTS 4,659,234 A    4/1987    Brouwer et al.
8,559,721 B1 *  10/2013   Bartholomew .... G01N 21/3504
                                                       356/438
(Continued)

FOREIGN PATENT DOCUMENTS

CN    103675019         3/2014
EP         973019 A1 *  1/2000   .............. G01J 5/602
(Continued)

*Primary Examiner* — David P Porta
*Assistant Examiner* — Jeremy S Valentiner
(74) *Attorney, Agent, or Firm* — Haynes and Boone, LLP

(57) ABSTRACT

Improved techniques for quantification of detected gases are provided. In one example, a method includes receiving infrared radiation from a scene at a sensor array comprising first and second sets of infrared sensors associated with first and second wavelength ranges of the infrared radiation, respectively. The method also includes capturing first and second images by the first and second sets of infrared sensors, respectively. The method also includes detecting a background object in the first image. The method also includes tracking the background object to identify the background object in the second image. The method also includes updating a radiometric scene map with first and second radiometric values associated with the first and second images and correlated to a location of the background object in the scene. The method also includes performing gas quantification using the radiometric scene map. Additional systems and methods are also provided.

20 Claims, 8 Drawing Sheets

Related U.S. Application Data

(60) Provisional application No. 62/613,247, filed on Jan. 3, 2018.

(51) Int. Cl.
    *G06T 7/254*         (2017.01)
    *H04N 5/33*          (2006.01)
    *H04N 5/232*        (2006.01)
    *G01N 21/3518*    (2014.01)

(52) U.S. Cl.
    CPC ........... *H04N 5/23277* (2013.01); *H04N 5/33* (2013.01); *G01N 2021/3522* (2013.01); *G01N 2021/3531* (2013.01)

(56) References Cited

U.S. PATENT DOCUMENTS

| | | |
|---|---|---|
| 8,917,327 B1 | 12/2014 | Bishay |
| 2005/0276308 A1 | 12/2005 | Pint |
| 2006/0081777 A1 | 4/2006 | Bevan et al. |
| 2013/0113939 A1* | 5/2013 | Strandemar ............ H04N 5/332 348/E5.09 |
| 2016/0321820 A1* | 11/2016 | Ely ..................... G06T 7/246 |
| 2017/0363541 A1 | 12/2017 | Sandsten et al. |
| 2020/0116583 A1* | 4/2020 | Hedberg ................ H04N 5/33 |

FOREIGN PATENT DOCUMENTS

| | | | |
|---|---|---|---|
| WO | WO 2006/044883 | 4/2006 | |
| WO | WO 2009/156362 | 12/2009 | |
| WO | WO 2016/139261 | 9/2016 | |
| WO | WO-2016138991 A1 * | 9/2016 | ............ G01J 3/0208 |

* cited by examiner

DYNAMIC DETERMINATION OF RADIOMETRIC VALUES USING MULTIPLE BAND SENSOR ARRAY SYSTEMS AND METHODS

CROSS-REFERENCE TO RELATED APPLICATIONS

This application is a continuation of International Patent Application No. PCT/US2018/067334 filed Dec. 21, 2018 and entitled "DYNAMIC DETERMINATION OF RADIOMETRIC VALUES USING MULTIPLE BAND SENSOR ARRAY SYSTEMS AND METHODS," which is incorporated herein by reference in its entirety.

International Patent Application No. PCT/US2018/067334 filed Dec. 21, 2018 claims priority and the benefit of U.S. Provisional Patent Application No. 62/613,247 filed Jan. 3, 2018 and entitled "DYNAMIC DETERMINATION OF RADIOMETRIC VALUES USING MULTIPLE BAND SENSOR ARRAY SYSTEMS AND METHODS," which is hereby incorporated by reference in its entirety.

TECHNICAL FIELD

The present invention relates generally to infrared imaging and, more particularly, to gas detection and quantification using thermal images.

BACKGROUND

In the field of optical gas imaging (OGI), various techniques are employed to detect the presence of gases. For example, specific gases may emit and/or absorb infrared (e.g. thermal) radiation in characteristic ways at particular wavelengths. Images may be captured of a scene and analyzed to determine the presence or absence of radiation at certain wavelengths. By comparing these wavelengths to the wavelengths associated with known gases, the presence of a particular gas of interest may be determined.

However, even if the presence of a gas is detected, many existing OGI systems cannot quantify the amount of gas present in a scene to a desirable level of accuracy. As such, conventional gas quantification techniques can be problematic.

For example, gas quantification calculations can be complicated by certain time varying factors such as scattering, emissivity, and reflectance related to infrared radiation associated with background objects and/or passing through the atmosphere. These factors can be problematic when trying to measure minute gas concentration lengths and mass flows in real life situations utilizing passive gas visualization.

Although some of the atmospheric factors can be reduced by decreasing the distance of the infrared imager to the imaged scene, variations in reflectance associated with background objects in the scene can remain problematic, even with short distances. In particular, such reflectance can vary significantly as a function of wavelength, depending on the surface properties of background objects.

For example, background objects may comprise various types of materials such as concrete, grass, wood, steel, paint, and many others. These materials may exhibit different radiometric properties. For example, such materials may have different reflectance properties over different ranges of infrared wavelengths.

A gas present in the scene may also have different radiometric properties over different ranges of infrared wavelengths (e.g., which may or may not overlap with those associated with the background materials). As a result, it can be difficult for conventional OGI systems to successfully quantify an amount of detected gas in a scene if they are not also provided with sufficient information regarding the radiometric values associated with the background portions of the scene over different ranges of infrared wavelengths. In particular, many conventional OGI systems are generally limited to detection in a single wavelength band and are therefore unable to support sufficiently accurate gas quantification determinations.

SUMMARY

Improved techniques for quantification of detected gases are provided. In various embodiments, two or more types of infrared sensors may be used to detect different ranges of infrared (e.g., thermal) wavelengths for background portions of a scene. By tracking the motion of background objects and imaging them with infrared sensors associated with different wavelength ranges (e.g., wavebands), a radiometric scene map of multiple radiometric values corresponding to the different wavelength ranges may be determined for the background portions of the scene. The radiometric scene map may be used to better discriminate between a detected gas and background portions of the scene, thus improving the system's ability to quantify the gas with improved accuracy over conventional single-band techniques.

In one embodiment, a method includes receiving infrared radiation from a scene at a sensor array comprising first and second sets of infrared sensors associated with first and second wavelength ranges of the infrared radiation, respectively; capturing first and second images by the first and second sets of infrared sensors, respectively; detecting a background object in the first image; tracking the background object to identify the background object in the second image; updating a radiometric scene map with first and second radiometric values associated with the first and second images and correlated to a location of the background object in the scene; and performing gas quantification using the radiometric scene map.

In another embodiment, a system includes a sensor array configured to receive infrared radiation from a scene, the sensor array comprising: a first set of infrared sensors configured to capture a first image associated with a first wavelength range of the infrared radiation, and a second set of infrared sensors configured to capture a second image associated with a second wavelength range of the infrared radiation; and a processor configured to: detect a background object in the first image, track the background object to identify the background object in the second image, update a radiometric scene map with first and second radiometric values associated with the first and second images and correlated to a location of the background object in the scene, and perform gas quantification using the radiometric scene map.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
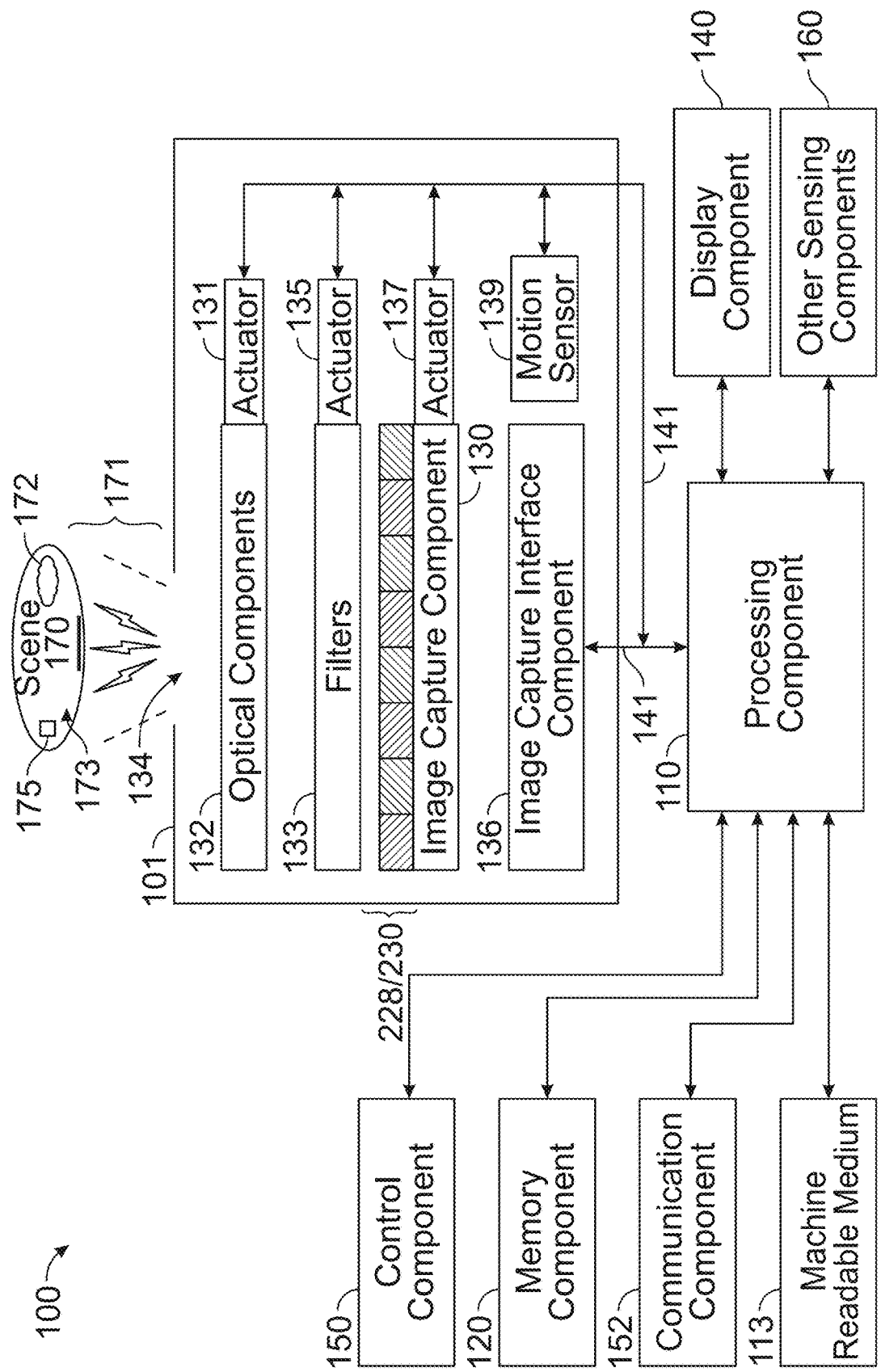
FIG. 1 illustrates a block diagram of an imaging system in accordance with an embodiment of the disclosure.

In accordance with various embodiments provided herein, radiometric values may be determined for background portions of a scene using an infrared sensor array providing pixel values associated with two or more infrared wavelength bands (e.g., a "dual band" or "dual color" infrared sensor array). In this regard, the sensor array may include two or more sets of infrared sensors responsive to different infrared wavelength bands. For example, in some embodiments, one set of infrared sensors may be responsive to a gas transparent wavelength band (e.g., a no-gas band that is not associated with absorption by a gas of interest), and another set of infrared sensors may be responsive to a gas absorbing wavelength band (e.g., a gas band).

In some embodiments, motion detection processes (e.g., including object detection, position tracking, image stabilization, and/or other techniques) may be performed on infrared images captured by the different sets of infrared sensors to determine if the same object at a given location in the scene has been captured by the different types of infrared sensors. For example, it may be detected if an object has been captured by one type of infrared sensor in an infrared image, and may be further detected if the object is captured by a different type of infrared sensor corresponding to a different wavelength range in a subsequent image. In some embodiments, movement of the object across the field of view of the sensor array may be caused by physical force applied to the sensor array as a result of, for example, user movement of the sensor array (e.g., a vibration or shaking of the user's hand in the case of a handheld thermal camera), an intentional movement of the sensor array and/or its associated optics, and/or other movement.

As infrared images are captured for all background locations of a scene (e.g., through panning or other types of movement of the sensor array), radiometric values captured by both types of infrared sensors may be gradually obtained and added to a radiometric scene map (e.g., also referred to as a balance map). Over time, a complete radiometric scene map of the entire background of the scene may be compiled which has two or more radiometric values associated with each background location in the scene.

In various embodiments, the radiometric scene map may be used to provide improved gas quantification determinations for detected gas within the scene. In particular, the multiple radiometric values may be used to provide improved measurements of gas concentration x length to support quantitative gas flow estimation calculations. By determining the radiometric values associated with different wavelength ranges of the background portion of the scene, the imaging system may be able to more accurately discriminate between the background portion and a gas interposed between the background portion and the infrared detector, thus reducing the problems associated with varying background emissivity and therefore improving gas quantification calculations.

In some cases, a gas plume may be present in the scene such that it is positioned between the infrared sensor array and a background portion of the scene. Therefore, in some embodiments, object detection processes may be performed on captured images to determine which pixels are associated with a gas plume, and which pixels are not. In this regard, if a gas plume is detected, then radiometric values captured for those pixels may be ignored for purposes of determining the background radiometric values for the radiometric scene map.

In various embodiments, different images may be captured that are responsive to different wavelengths (e.g., different wavelength ranges corresponding to different wavebands).

Additionally, the signals provided by the different sets of infrared sensors may be balanced (e.g., normalized) relative to each other, for example, by providing different physical configurations of various structures in the infrared sensors and/or by performing additional processing on the signals.

In some embodiments, the different sets of infrared sensors may be interleaved with each other and distributed throughout the sensor array. As a result, adjacent infrared sensors may capture different images that are spatially-aligned and time-aligned with each other. For example, the infrared sensors may be responsive to different spectral bands to capture different features in the images (e.g., a gas of interest in one image and a background portion of a scene in another image). Such images may be advantageously used to detect the presence of gas with improved accuracy and high confidence.

As a result, the sensor array may effectively capture at least two different images of a scene simultaneously. For example, a first image may correspond to a first wavelength range of infrared radiation, and a second image may correspond to a second wavelength range of infrared radiation.

In some embodiments, successive images may be captured over time with various movements of the sensor array occurring between such capturing. For example, the different sets of infrared sensors may simultaneously capture images at a first time, followed by a movement, after which the different sets of infrared sensors may then simultaneously capture additional images at a second time. Background objects may be detected and tracked across the various images to determine multiple radiometric values corresponding to different wavelength ranges for the objects associated with particular locations in the imaged scene.

By implementing at least two types of infrared sensors associated with at least two different spectral bands (e.g., wavelength ranges), the captured images may be used to detect and quantify gases of interest. For example, one set of infrared sensors may be responsive to wavelengths associated with a gas to provide one image with pixels corresponding to the sensor array's response at the gas wavelengths (e.g., a "gas image" made up of corresponding "gas pixels"). Another set of infrared sensors may be responsive to wavelengths associated with background radiation of a scene to provide another image with pixels corresponding to the sensor array's response at the background wavelengths (e.g., a "no-gas image" made up of corresponding "no-gas pixels"). In some examples, the wavelengths of the images may overlap (e.g., both images may be responsive to background wavelengths, while only one image is further responsive to gas wavelengths). The different response characteristics of the sets of infrared sensors may be used to provide images that are effectively filtered in accordance with the response characteristics of the infrared sensors.

In various embodiments, the particular wavelength ranges may be selected such that all of the sensors (e.g., receiving gas or no-gas filtered infrared radiation) exhibit responses (e.g., provide signals) corresponding to a desired range of pixel values of the captured images. As a result, the captured images may be more effectively processed, calibrated, and compared with each other.

In some cases, the gas image may exhibit low Noise Equivalent Concentration Length (NECL) and high gas contrast. In addition, the no-gas image may exhibit only minimal contributions from the absorption or emission associated with the gas of interest. Thus, the resulting gas and no-gas images may exhibit high image quality and can be used for accurate quantification and gas visualization. Accordingly, in some embodiments, the various wavelength ranges may be optimized for low NECL and high gas contrast. Also, in some embodiments, the various wavelength ranges and positioning of filter-related components may be selected to minimize reflectance (e.g., to avoid rapidly changing responses due to reflectance which may cause the infrared sensors to exhibit inconsistent signals that vary over time).

Such arrangements contrast with conventional single-filter approaches in which only a portion of the sensors of an array may be filtered. In such single-filter approaches, only a subset of the sensors are filtered to generate an image used to identify background radiation, while the remaining unfiltered sensors are used to generate an image used to identify a gas of interest. As a result, the unfiltered sensors receive infrared radiation across a wide range of wavelengths, while the filtered sensors receive only a filtered portion of the infrared radiation. This can cause significant disparities in the response of filtered and unfiltered sensors of the array. In such cases, various calibrations must be implemented for the unfiltered and filtered sensors. Thus, images from the filtered and unfiltered images may not be fully captured at the same time.

Moreover, in conventional single-filter approaches, there is typically significant overlap in the wavelengths of infrared radiation received by the filtered and unfiltered sensors. For example, the background radiation filter may still pass at least a subset of the wavelengths associated with the gas of interest. Thus, a gas present in the imaged scene may cause both the filtered and unfiltered sensors to respond. This can significantly complicate and reduce the accuracy of gas visualization and quantification processes using the filtered and unfiltered images. For example, the unfiltered image may correspond to a broad range of wavelengths, resulting in low gas contrast. In addition, the filtered image may exhibit high Noise Equivalent Temperature Difference (NETD) values due to its narrow band, thus making quantification less accurate.

In contrast, the use of at least two sets of infrared sensors responsive to corresponding to different wavelength bands and positioned adjacently as discussed herein permits two differently filtered images to be reliably captured and effectively processed. For example, because the different infrared sensors are distributed throughout the sensor array, different images captured by the different infrared sensors are physically-aligned (e.g., to remove parallax between the images) and are time-aligned (e.g., simultaneously captured).

Also, in cases where all sensors of the array are pre-filtered (e.g., by a full array filter), extraneous out-of-band infrared radiation is removed and the resulting pixels therefore correspond only to the particular wavelengths of interest. As a result, in some embodiments, the sensors may be calibrated with the same integration periods (e.g., integration times) and exhibit acceptably low NETD values. In other embodiments, different integration times may be used for the different types of infrared sensors to further balance the signals provided thereby for the captured images.

Although a sensor array having two types of infrared sensors associated with two corresponding wavelength ranges are discussed herein, it will be understood that additional types of infrared sensors may be used. For example, in some embodiments, three or more images each corresponding to one of three or more wavelength ranges may be used where appropriate. Similarly, additional radiometric values may be associated with a radiometric scene map in some embodiments.

Turning now to the drawings, FIG. 1 illustrates a block diagram of an imaging system 100 in accordance with an embodiment of the disclosure. Imaging system 100 may be used to capture and process images in accordance with techniques described herein. In some embodiments, various components of imaging system 100 may be provided in a camera component 101, such as an imaging camera. In other embodiments, one or more components of imaging system 100 may be implemented remotely from each other in a distributed fashion (e.g., networked or otherwise).

In some embodiments, imaging system 100 may be used to detect and/or quantify one or more gases of interest within a scene 170. For example, imaging system 100 may be configured to capture one or more images of scene 170 using camera component 101 (e.g., a thermal imaging camera) in response to infrared radiation 171 received from scene 170. Infrared radiation 171 may correspond to wavelengths that are emitted and/or absorbed by a gas 172 within scene 170, and other wavelengths that are emitted and/or absorbed by a background portion 173 of scene 170 including one or more background objects 175.

Captured images may be received by a processing component 110 and stored in a memory component 120. Processing component 110 may be configured to process the captured images in accordance with gas detection and quantification techniques discussed herein.

In some embodiments, imaging system 100 includes processing component 110, a machine readable medium 113, a memory component 120, image capture component 130 (e.g., implemented by a sensor array 228 of infrared sensors 230 including at least two sets of alternating sensors as further discussed herein), one or more filters 133, optical components 132 (e.g., one or more lenses configured to receive infrared radiation 171 through an aperture 134 in camera component 101), an image capture interface component 136, a display component 140, a control component 150, a communication component 152, and other sensing components 160.

In some embodiments, imaging system 100 may be implemented as an imaging camera, such as camera component 101, to capture images, for example, of scene 170 (e.g., a field of view). In some embodiments, camera component 101 may include image capture component 130, optical components 132, and image capture interface component 136 housed in a protective enclosure (e.g., a housing). In various embodiments, any desired combination of components of system 100 may be provided in a housing or other type of protective enclosure as appropriate that may be held by a user and/or mounted in a fixed location. Imaging system 100 may represent any type of camera system which, for example, detects electromagnetic radiation (e.g., infrared radiation 171) and provides representative data (e.g., one or more still images or video images). For example, imaging system 100 may represent a camera component 101 that is directed to detect infrared radiation and/or visible light and provide associated image data.

In some embodiments, imaging system 100 may include a portable device and may be implemented, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive images of scene 170.

In some embodiments, processing component 110 may include any desired type of logic circuit such as, for example, a microprocessor, a single-core processor, a multi-core processor, a microcontroller, a programmable logic device, a digital signal processing (DSP) device, one or more memories for storing executable instructions (e.g., software, firmware, or other instructions), and/or any other appropriate combinations of processing device and/or memory to execute instructions to perform any of the various operations described herein. Processing component 110 is configured to interface and communicate with the various components illustrated in FIG. 1 to perform method and processing steps as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is configured to execute software stored in memory component 120 and/or machine readable medium 113 to perform various methods, processes, and operations in a manner as described herein.

In some embodiments, image capture component 130 may include an array of sensors (e.g., any type visible light, infrared, or other type of detector) for capturing images of scene 170. In one embodiment, the sensors of image capture component 130 provide for representing (e.g., converting) a captured images of scene 170 as digital data (e.g., via an analog-to-digital converter included as part of the sensor or separate from the sensor as part of imaging system 100). As further discussed herein, image capture component 130 may be implemented as an array of infrared sensors having at least two different types of sensors distributed among the various sensors of the array and used to capture different wavelength ranges.

As also shown, camera component 101 may also include actuators 131, 135, and 137 under control of processing component 110 through connections 141. In some embodiments, processing component 110 may control actuators 131, 135, and/or 137 through signals provided over connections 141 to cause optical components 132, filters 133, and/or image capture component 130 to move (e.g., thus adjusting the physical position of an optical path provided by such components relative to scene 170). Camera component 101 may also include a motion sensor 139 (e.g., an accelerometer or other appropriate device) used to detect motion of camera component 101 and provide corresponding signals to processing component 110 over connections 141. As a result of the intentional movement of actuators 131/135/137 and/or a movement detected by motion sensor 139, images corresponding to different wavelength ranges may be captured for the same locations of scene 170 as further discussed herein.

In some embodiments, processing component 110 may be configured to receive images from image capture component 130 over connections 141, process the images, store the original and/or processed images in memory component 120, and/or retrieve stored images from memory component 120. In various aspects, processing component 110 may be remotely positioned, and processing component 110 may be configured to remotely receive images from image capture component 130 via wired or wireless communication with image capture interface component 136, as described herein. Processing component 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Processing component 110 may be configured to display image data and information on display component 140. Processing component 110 may be configured to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In some embodiments, control component 150 may include a user input and/or interface device having one or more user actuated components, such as one or more push buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Processing component 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, processing component 110 may be configured to communicate with image capture interface component 136 (e.g., by receiving data and information from image capture component 130). Image capture interface component 136 may be configured to receive images from image capture component 130 and communicate the images to processing component 110 directly or through one or more wired or wireless communication components (e.g., represented by connections 141) in the manner of communication component 152 further described herein. Camera component 101 and processing component 110 may be positioned proximate to or remote from each other in various embodiments.

In some embodiments, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a network interface component (NIC) configured for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
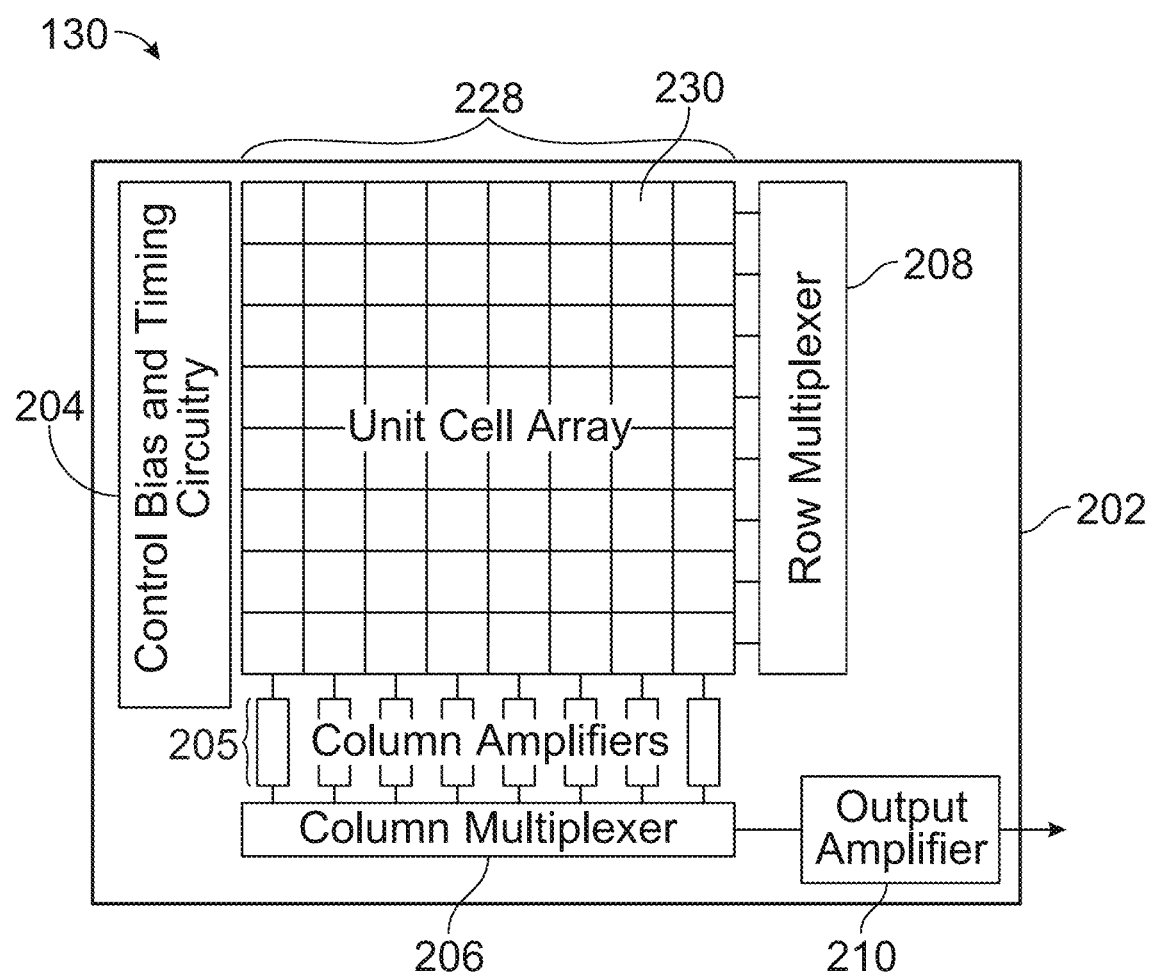
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including a sensor array 228 of infrared sensors 230 (e.g., implemented as unit cells) and a read out integrated circuit (ROIC) 202. Although an 8 by 8 array of infrared sensors 230 is shown and other array sizes are further identified by the present disclosure, this is merely for purposes of example and ease of illustration. Any desired sensor array size may be used as desired.

ROIC 202 includes bias generation and timing control circuitry 204, column amplifiers 205, a column multiplexer 206, a row multiplexer 208, and an output amplifier 210. Images captured by infrared sensors 230 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Each infrared sensor 230 may be implemented, for example, by an infrared detector such as a microbolometer and associated circuitry to provide image data (e.g., a data value associated with a captured voltage) for a pixel of a captured image. In this regard, time-multiplexed electrical signals may be provided by the infrared sensors 230 to ROIC 202.

Figure 3:
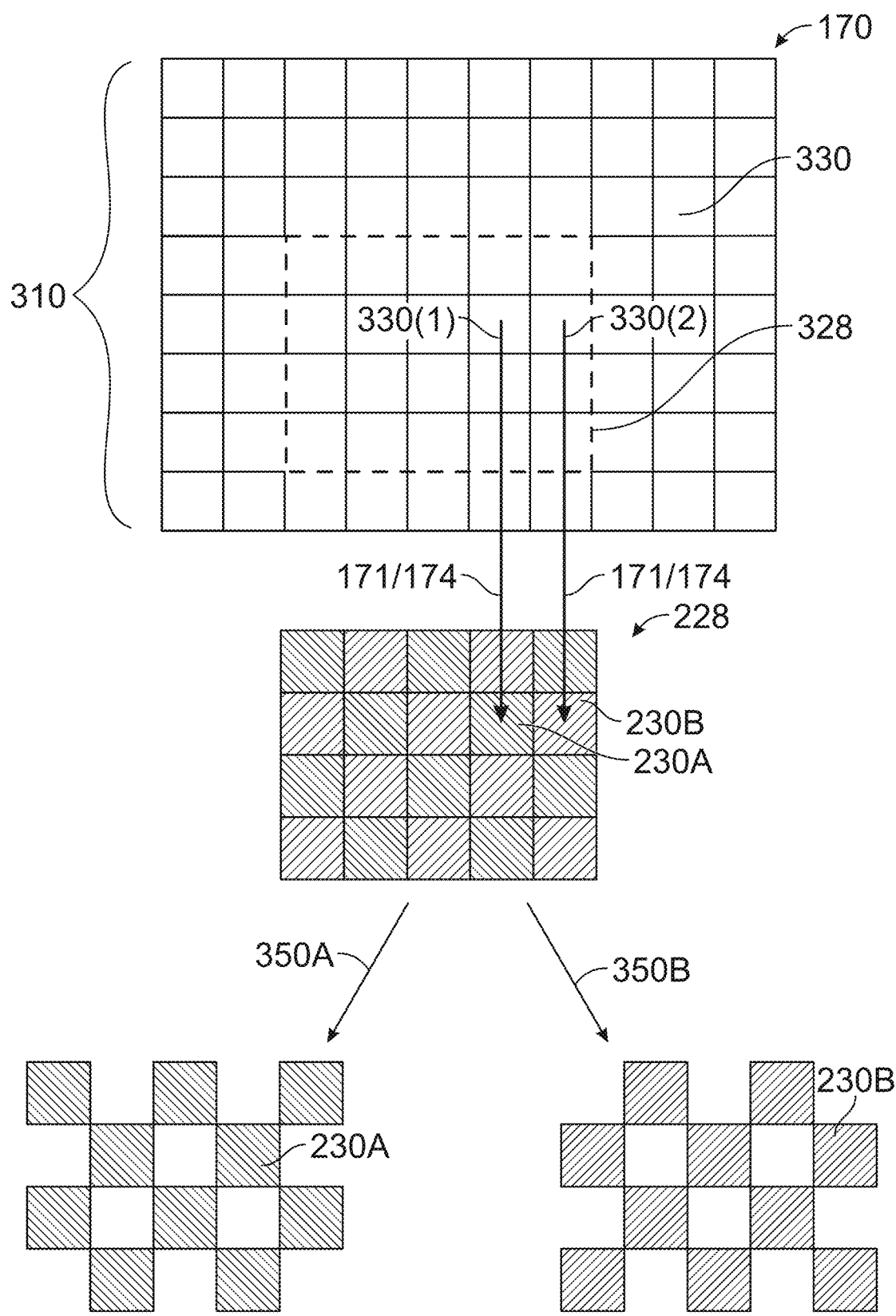
FIG. 3 illustrates a sensor array in relation to various locations of an imaged scene in accordance with an embodiment of the disclosure.

Referring now to FIG. 3, senor array 228 may include at least two sets of infrared sensors 230 (e.g., identified as infrared sensors 230A and 230B), each of which is used to capture a different wavelength range (e.g., a gas band and a no-gas band). In various embodiments, infrared sensors 230A and 230B may be arranged in a variety of patterns to permit two images corresponding to different spectral response patterns to be captured by the same FPA.

For example, FIG. 3 illustrates sensor array 228 with two sets of infrared sensors 230A and 230B arranged in an alternating checkerboard pattern in accordance with an embodiment of the disclosure. Other patterns are also contemplated including, for example, alternating row or column patterns (e.g., rows and columns may be used interchangeably herein) and/or others as appropriate.

In FIG. 3, scene 170 is represented by various scene locations 330 which correspond to locations in a radiometric scene map 310. As discussed herein, radiometric values corresponding to two different wavelength ranges may be captured for all scene locations 330 to populate radiometric scene map 310 for use in gas concentration processing.

As also shown in FIG. 3, sensor array 228 is positioned in front of scene 170 to capture images corresponding to a subset 328 of radiometric scene map 310. For example, as shown, one of the infrared sensors 230A is positioned to receive infrared radiation 171 (e.g., filtered radiation 174 in some embodiments) from a scene location 330(1) of subset 328. Another one of the infrared sensors 230B is positioned to receive infrared radiation 171 (e.g., filtered radiation 174 in some embodiments) from a scene location 330(2) of subset 328. Because infrared sensors 230A and 230B are used to capture different wavelength ranges, two different infrared images 350A and 350B may be captured of different locations 330 within subset 328, each of which corresponds to a different wavelength range.

Various implementations may be used to capture different wavelength ranges by infrared sensors 230A and 230B. For example, in some embodiments, the structure of infrared sensors 230A and 230B may be configured to cause them to exhibit particular spectral response patterns corresponding to particular wavelength ranges, such as microbolometers configured with various types of absorption layers, bridge structures, leg structures, material selections, and/or other features, such as those set forth in U.S. Patent Application No. 62/612,272 filed Dec. 29, 2017 which is incorporated herein by reference in its entirety.

In some embodiments, one or more filters implemented by photo masks, substrates, coatings, and/or other materials may be positioned in front of infrared sensors 230A and 230B (e.g., as part of optical components 132, filters 133, and/or otherwise) to filter infrared radiation 171 such that infrared sensors 230A and 230B receive filtered infrared radiation corresponding to desired wavelength ranges. In some embodiments, any of the filters contemplated herein may be implemented in accordance with those set forth in International Patent Application No. PCT/US2017/064759 filed Dec. 5, 2017 which is incorporated herein by reference in its entirety.

In some embodiments, such filters may be provided with an FPA implemented with a uniform set of infrared sensors 230 (e.g., without different physical configurations provided among infrared sensors 230A and 230B). In other embodiments, such filters may be provided with an FPA implemented with one or more of the physical configurations of infrared sensors 230A and 230B discussed herein.

In some embodiments, infrared sensors 230A may be implemented as gas sensors providing images corresponding to wavelengths associated with one or more gases to be detected. As a result, infrared sensors 230A may be used to provide gas pixels of gas images. Infrared sensors 230B may be implemented as no-gas sensors providing images omitting wavelengths associated with one or more gases to be detected. As a result, infrared sensors 230B may be used to provide no-gas pixels of no-gas images.

Because infrared sensors 230A and 230B are distributed throughout the sensor array (e.g., in various patterns as discussed), the resulting gas images and no-gas images may be more effectively aligned with each other. In addition, because infrared sensors 230A and 230B and/or filters 133 may be configured to restrict the wavelengths used to provide such images, infrared sensors 230A and 230B may be operated with the same (e.g., identical) integration periods, gain settings, and readout frame rates in some embodiments. In other embodiments, these may be different for infrared sensors 230A and 230B.

In some embodiments, ROIC 202 may be configured to compensate for different signals received from infrared sensors 230A and 230B. For example, because infrared sensors 230A and 230B may be associated with different wavelengths (e.g., which may or may not partially overlap with each other), the resulting current signals received by ROIC from infrared sensors 230A and 230B may vary in amplitude relative to each other or be otherwise disproportionate.

Accordingly, in some embodiments, ROIC 202 may be configured to adjust the integration times, increase or decrease the resulting captured voltages (or other analog signal or digital value), and/or other features associated with infrared sensors 230A and/or 230B so that they may be effectively compared with each other. In some embodiments, the ROIC 202 may be implemented in accordance with any of the various configurations identified in: U.S. Patent Application No. 62/446,287 filed Jan. 13, 2017, U.S. Patent Application No. 62/450,967 filed Jan. 26, 2017, U.S. Patent Application No. 62/588,878 filed Nov. 20, 2017, U.S. Patent Application No. 62/599,574 filed Dec. 15, 2017, and/or U.S. Patent Application No. 62/611,711 filed Dec. 29, 2017, all of which are incorporated herein by reference in their entirety.

Figure 4:
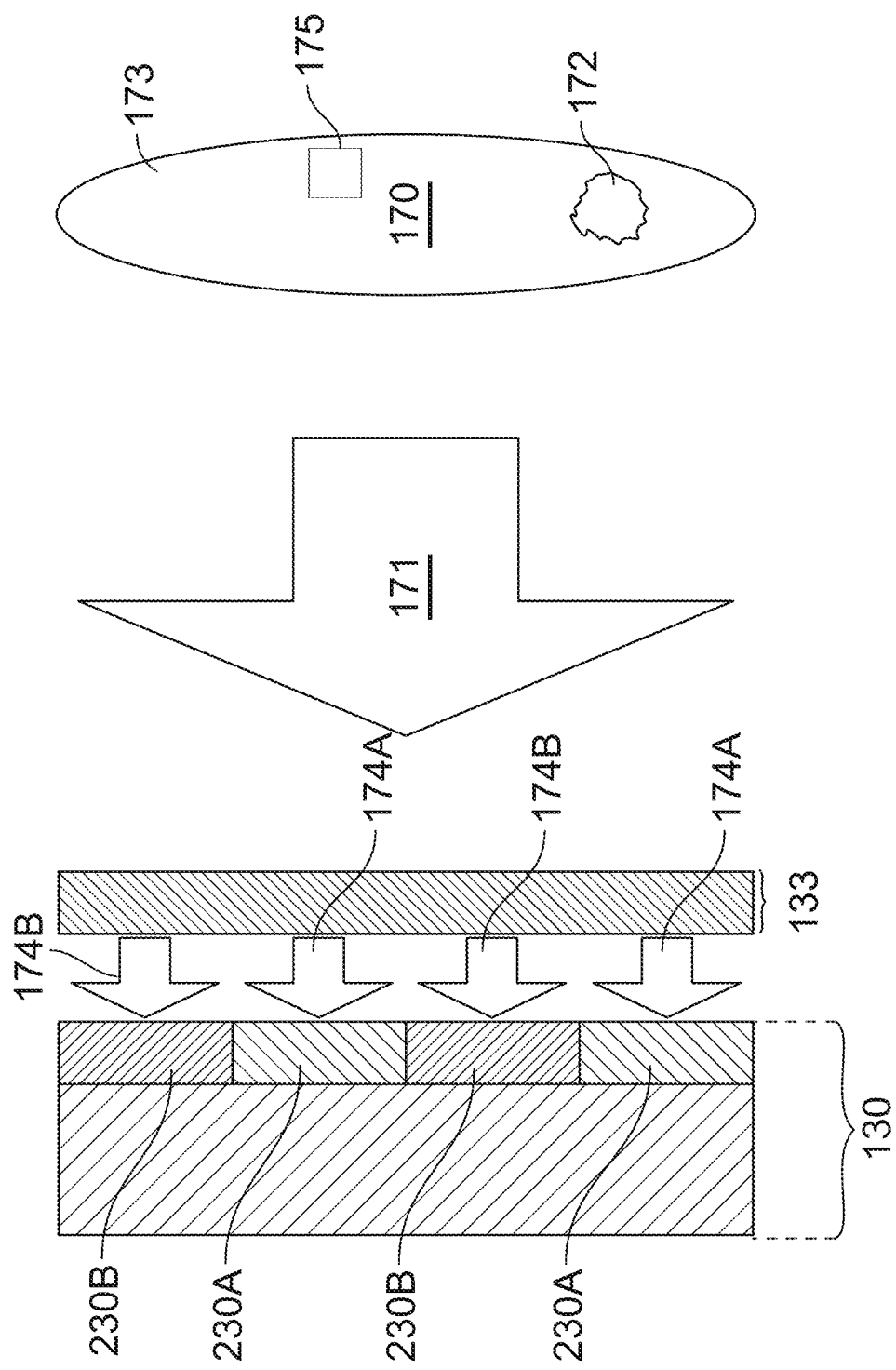
FIG. 4 illustrates a side view of infrared sensors and one or more associated filters in accordance with an embodiment of the disclosure.

FIG. 4 illustrates a side view of infrared sensors 230A and 230B and one or more filters 133 in accordance with an embodiment of the disclosure. As shown, filters 133 receive infrared radiation 171 from scene 170 (e.g., corresponding to wavelengths that are emitted and/or absorbed by gas 172 and/or background portion 173 including background object 175) and provide filtered infrared radiation 174A and 174B to infrared sensors 230A and 230B, respectively, of sensor array 228 of image capture component 130.

In some embodiments, filters 133 may be implemented as pixel-wise filters with each filter 133 associated with a corresponding infrared sensor 230A or 230B. In some embodiments, filters 133 may include one or more full array filters to remove extraneous out-of-band radiation received from scene 170 such that filtered infrared radiation 174A and 174B provided to infrared sensors 230A and 230B is further limited to particular filtered wavelengths of interest. As a result, the signals provided by infrared sensors 230A and 230B for their associated pixels may exhibit improved signal-to-noise ratios.

In some embodiments, as discussed, the structure of infrared sensors 230A and 230B themselves may be configured to provide desired spectral responses corresponding to wavelength ranges of interest. Accordingly, it will be understood that any desired combination of filters and/or infrared sensor structures may be used to capture images corresponding to wavelength ranges of interest.

Various wavelength ranges may be associated with the images captured by infrared sensors 230A and 230B depending on the particular gas of interest to be imaged to provide gas band and no-gas band images. In this regard, the wavelength ranges may be selected (e.g., tuned or optimized) to detect various gases of interest.

For example, in the case of methane (CH4) (e.g., which generally absorbs radiation in a wavelength range of approximately 7 microns to approximately 8.5 microns), a gas band wavelength range of approximately 7 microns to approximately 10 microns may be used for infrared sensors 230A and a no-gas band wavelength range of approximately 8.5 microns to approximately 10 microns may be used for infrared sensors 230B. As a result, image 350A provided by infrared sensors 230A may be a gas image that represents the presence or absence of methane in gas 172 within scene 170, while image 350B provided by infrared sensors 230B may be a no-gas image that represents background portion 173 of scene 170.

As another example, in the case of a refrigerant gas (e.g., which generally absorbs radiation in a wavelength range of approximately 8 microns to approximately 8.6 microns), a gas band wavelength range of approximately 8 microns to approximately 11 microns may be used for infrared sensors 230A and a no-gas band wavelength range of more than 8 microns to approximately 11 microns may be used for infrared sensors 230B. As a result, image 350A provided by infrared sensors 230A may be a gas image that represents the presence or absence of a refrigerant gas in gas 172 within scene 170, while image 350B provided by infrared sensors 230B may be a no-gas image that represents background portion 173 of scene 170.

As another example, in the case of sulfur hexafluoride (SF6) and ammonium (NH4) (e.g., which generally absorb radiation in a wavelength range of approximately 10 microns to approximately 11 microns), a gas band wavelength range of approximately 8.8 microns to approximately 11 microns may be used for infrared sensors 230A and a no-gas band wavelength range of approximately 8.8 microns to approximately 10 microns may be used for infrared sensors 230B. As a result, image 350A provided by infrared sensors 230A may be a gas image that represents the presence or absence of sulfur hexafluoride (SF6) and ammonium (NH4) in gas 172 within scene 170, while image 350B provided by infrared sensors 230B may be a no-gas image that represents background portion 173 of scene 170.

Although various wavelength ranges have been discussed, it will be understood that they are provided merely for purposes of example. As such, any desired wavelength ranges may be used as appropriate.

Figure 5:
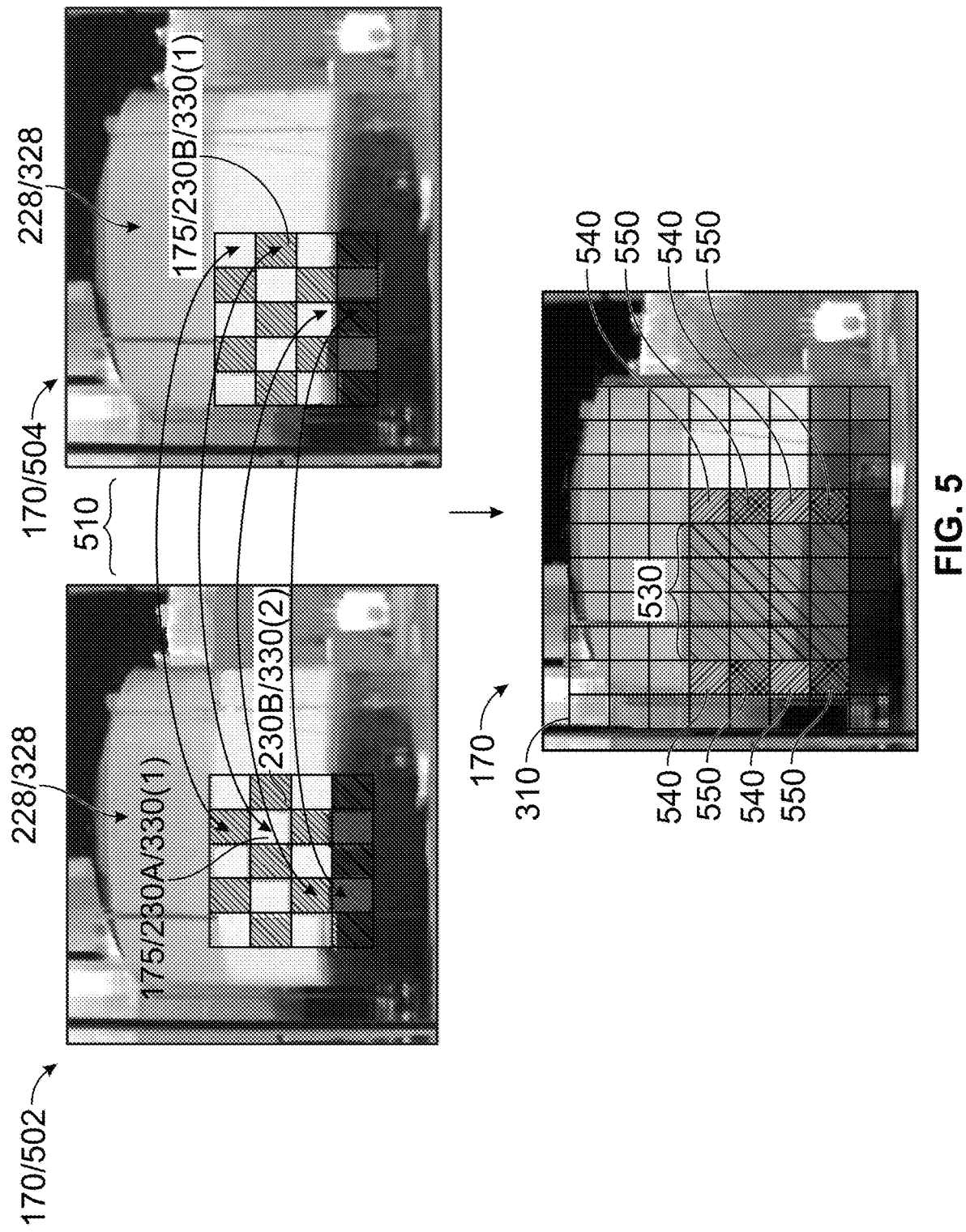
FIG. 5 illustrates several positions of a scene relative to a sensor array to prepare a radiometric scene map in accordance with an embodiment of the disclosure.

FIG. 5 illustrates several positions of scene 170 relative to infrared sensors 230A and 230B of sensor array 228 during image capture to prepare radiometric scene map 310 in accordance with an embodiment of the disclosure. In particular, an initial position 502 of scene 170 is shown relative to sensor array 228, and a subsequent position 504 of scene 170 is shown relative to sensor array 228 (e.g., following a movement as discussed herein).

In position 502, sensor array 228 includes different infrared sensors 230A and 230B positioned to capture a subset 328 of scene locations 330. As similarly discussed with regard to FIG. 3, one of the infrared sensors 230A is positioned to capture a pixel value for an infrared image corresponding to scene location 330(1), and another one of the infrared sensors 230B is positioned to capture a pixel value for an infrared image corresponding to scene location 330(2).

Between the time of position 502 and 504, a movement has occurred such that infrared sensors 230A and 230B have shifted to the left relative to scene 170 by one pixel. As a result of this shift, scene location 330(1) which was previously imaged by one of infrared sensors 230A while in position 502, is now imaged by one of infrared sensors 230B while in position 504. Arrows 510 denote corresponding positions of scene 170 that have shifted relative to image sensors 230A and 230B between positions 502 and 504.

By capturing images with infrared sensors 230A and 230B at both of positions 502 and 504, two radiometric values (e.g., corresponding to signals provided by infrared sensors 230A and 230B for image pixels) corresponding to different wavelength regions may be captured for the scene locations 330 that overlap the images of positions 502 and 504. These two radiometric values may be added to radiometric scene map 310 as similarly discussed with regard to FIG. 3.

For example, FIG. 5 further illustrates radiometric scene map 310 for the particular illustrated scene 170. In this case, a set of scene locations 530 have been imaged by both types of infrared sensors 230A and 230B as a result of the images captured at positions 502 and 504. Accordingly, radiometric scene map 310 will include two radiometric values for each of scene locations 530. Meanwhile, scene locations 540 have only been imaged by infrared sensors 230A and therefore have only one radiometric value associated with one wavelength range for radiometric scene map 310. Similarly, scene locations 550 have only been imaged by infrared sensors 230B and therefore have only one radiometric value associated with another wavelength range for radiometric scene map 310. Moreover, scene locations 530 have not been captured by either infrared sensors 230A or 230B and therefore have no radiometric values for radiometric scene map 310.

Over time, as additional movements occur and infrared sensors 230A and 230B continue to capture images, all scene locations 330 of scene 170 may eventually be imaged by both types of infrared sensors 230A and 230B. As a result, two radiometric values may be obtained for each scene location 330 to provide a complete radiometric scene map 310.

Figure 6:
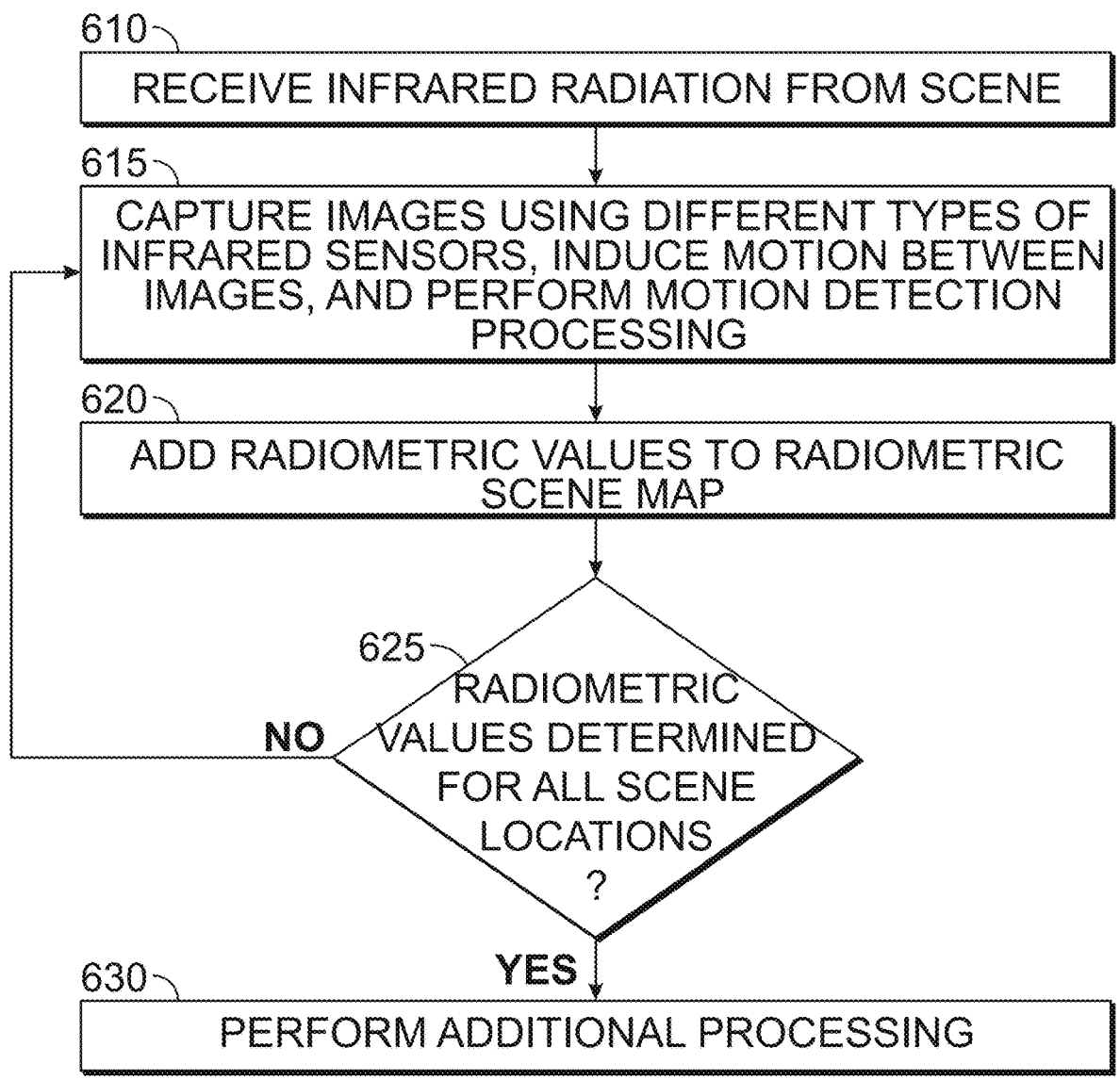
FIG. 6 illustrates a process of building a radiometric scene map in accordance with an embodiment of the disclosure.

FIG. 6 illustrates a process of building radiometric scene map 310 in accordance with an embodiment of the disclosure. In block 610, system 100 receives infrared radiation 171 from scene 170. For example, system 100 may be initially positioned relative to scene 170 as shown in position 502 of FIG. 5.

In block 615, image capture component 130 begins capturing images of the subset 328 of scene locations 330 using different types of infrared sensors 230A and 230B. Accordingly, different images 350A and 350B may be captured of scene 100 corresponding to different portions of subset 328. Image capture component 130 may continue capturing images during the process of FIG. 6 in order to obtain radiometric values for all scene locations 330 of radiometric scene map 310 as discussed herein.

Also in block 615, motion is induced between successive captured images such that subset 328 shifts relative to scene 170 (e.g., from position 502 to position 504) as discussed herein. Also in block 615, processing component 110 performs motion detection processing on the captured images to determine whether radiometric values have been captured for a given scene location 330 by both types of infrared sensors 230A and 230B. Additional details of the operations performed in block 615 are further discussed herein with regard to FIG. 7.

In block 620, processing component 110 adds radiometric values to radiometric scene map 310 corresponding to both wavelength ranges for the scene locations 330 determined to have been imaged by both infrared sensors 230A and 230B.

In block 625, if radiometric values corresponding to both wavelength ranges have been determined for all scene locations 330 in radiometric scene map 310, then the process continues to block 630. Otherwise, the process returns to block 615 to continue capturing images, inducing motion, and processing until radiometric values corresponding to both wavelength ranges have been determined for all scene locations 330 in radiometric scene map 310.

Figure 8:
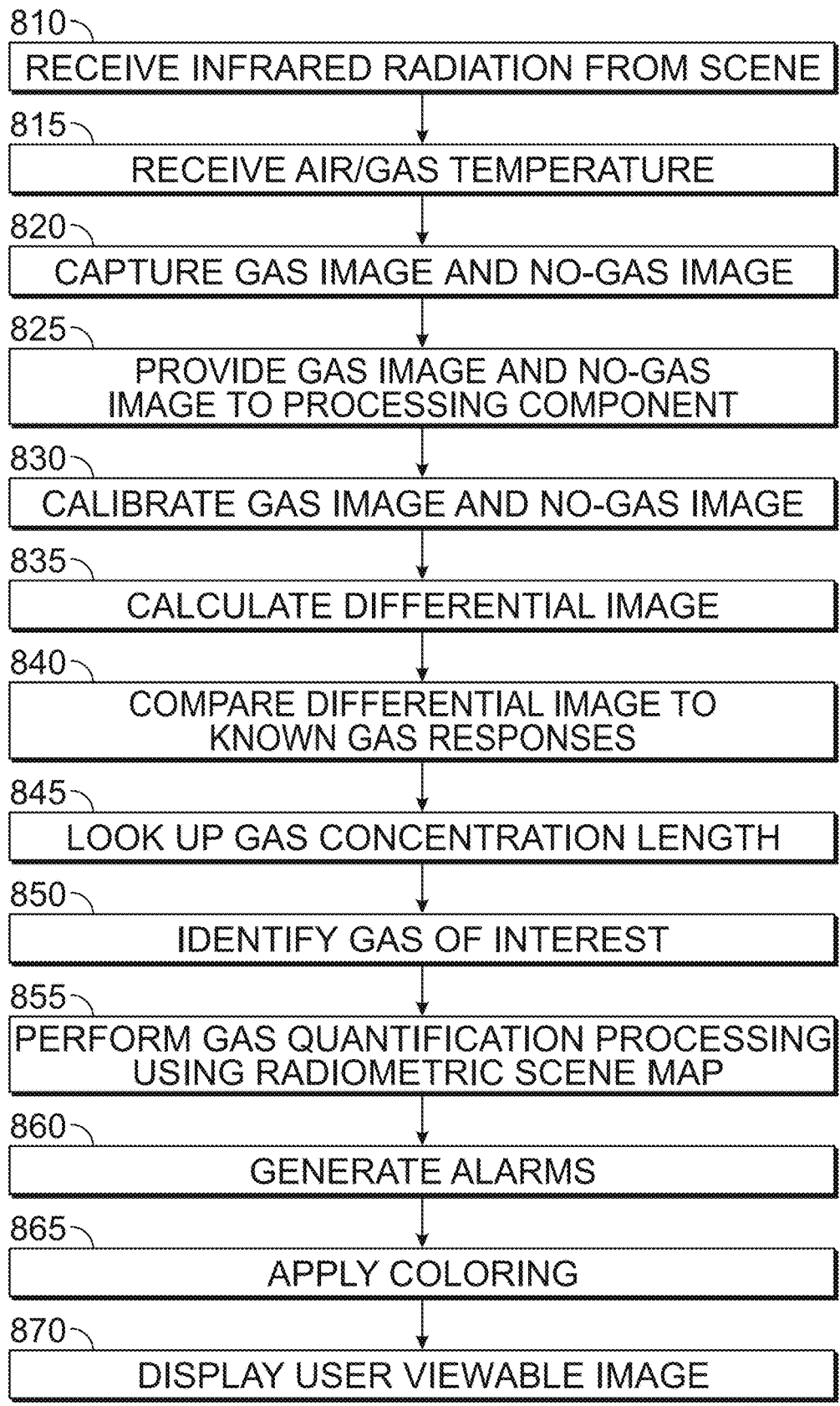
FIG. 8 illustrates a process of performing gas detection and quantification in accordance with an embodiment of the disclosure.

In block 630, additional gas detection and gas quantification operations may be performed as further discussed with regard to FIG. 8.

Figure 7:
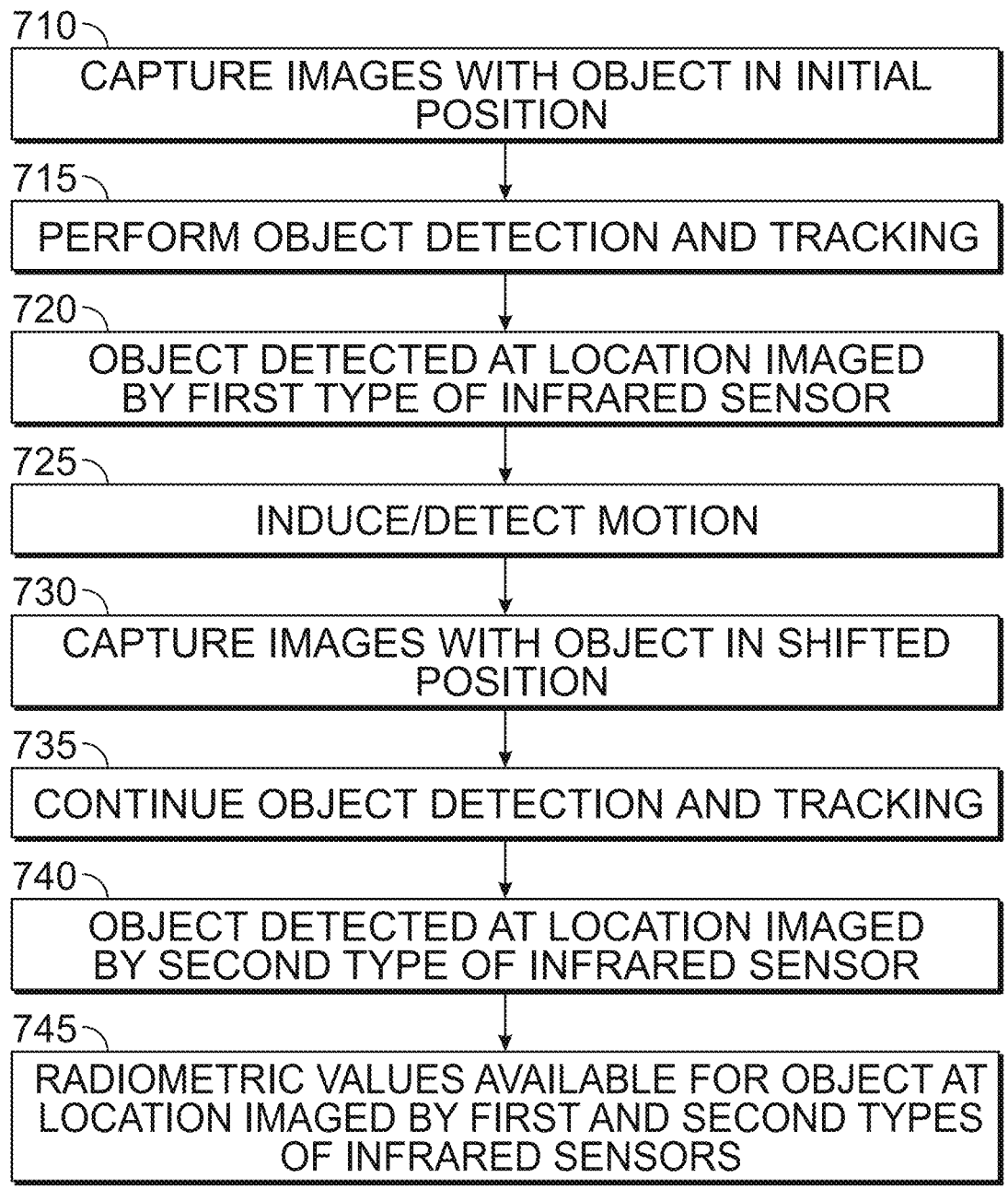
FIG. 7 illustrates a process of determining radiometric values of a scene location in accordance with an embodiment of the disclosure.

FIG. 7 illustrates a process of determining radiometric values of a scene location 330 in accordance with an embodiment of the disclosure. For example, in some embodiments, the process of FIG. 7 may be performed during block 615 of FIG. 6.

In block 710, infrared sensors 230A and 230B capture images 350A and 350B of subset 328 of scene 170 while in position 502 of FIG. 5. In block 715, processing component 110 receives the captured images 350A and 350B and begins performing motion detection processing, such as object detection and tracking.

In block 720, processing component 110 identifies background object 175 at scene location 330(1). Accordingly, processing component 110 may determine that background object 175 at scene location 330(1) has been captured by one of infrared sensors 230A corresponding to a gas band wavelength range.

In block 725, motion is induced and/or detected which causes infrared sensors 230A and 230B to shift from position 502 to position 504 relative to scene 170. As discussed, such motion may be caused, for example, by physical force applied to sensor array 228 associated with user movement of sensor array 228 (e.g., a vibration or shaking of the user's hand while holding camera component 101), an intentional movement caused by actuators 131, 135, and/or 137, and/or other movement.

For example, in the case of a vibration or shaking, motion sensor 139 may detect the motion and provide appropriate response signals to processing component 110. In the case of force applied by actuators 131/135/137, one or more of them may be used to shift the optical path provided by optical components 132, filters 133, and image capture component 130 such that infrared sensors 230A and 230B receive infrared radiation 171 from a different portion of scene 170. Advantageously, in the case of actuators 131/135/137, the induced motion may be performed in a controlled manner such that a predetermined shift may be performed (e.g., a shift of one pixel or any odd number of pixels in some embodiments).

In block 730, infrared sensors 230A and 230B capture images 350A and 350B of subset 328 of scene 170 while in position 504 of FIG. 5. In block 735, processing component 110 receives the captured images 350A and 350B (e.g., corresponding to the shifted position 504) and continues performing motion detection processing.

In block 740, processing component 110 identifies background object 175 at scene location 330(1). For example, processing component 110 may determine that background object 175 is still at scene location 330(1) which has now been captured by one of infrared sensors 230B corresponding to a no-gas band wavelength range.

Thus, processing component 110 may determine that radiometric values have been captured for background object 175 corresponding to two wavelength ranges (e.g., the wavelength range captured by infrared sensor 230A in block 710 and the wavelength range captured by infrared sensor 230B in block 730). Accordingly, processing component 110 may proceed to update the radiometric scene map 310 in block 620 of FIG. 6.

Although the processes of FIGS. 6 and 7 are discussed in relation to a single background object 175, multiple objects may be detected and tracked which correspond to various different scene locations 330 in scene 170. As a result, radiometric values may be determined for all scene locations 330 of radiometric scene map 310.

In some embodiments, radiometric scene map 310 may be valid for a limited period of time. This may be determined, for example, by time constants of vibration, detected movement of objects within scene 170, detected movement, and/or an overall amount of infrared radiation 171 received by sensor array 228. Accordingly, in some embodiments, the process of FIG. 6 may be repeated to update radiometric scene map 310 as appropriate to obtain current radiometric values.

In some embodiments, the object detection and motion tracking processing discussed herein may include determining whether the shape and/or movement of detected objects correspond to a gas 172 in scene 170. As discussed, the processes of FIGS. 6 and 7 may be used to determine radiometric values for background portion 173 of scene 170 in order to improve the accuracy of gas concentration determinations. As such, in some cases, it may be counterproductive if the radiometric values added to radiometric scene map 310 correspond to gas 172 rather than background portion 173. Accordingly, in some embodiments, if the object detected and tracked is determined to be gas 172 rather than a background object 175, then processing component 110 may discard or otherwise ignore the radiometric values associated with those images.

Although a single pixel shift is identified in the example discussed, it will be understood that any number of pixel shifts may occur. For example, in the case of an odd number of pixel shifts, then a given scene location 330 may be captured by different types of infrared sensors 230A and 230B in blocks 710 and 730 as discussed.

However, in the case of an even number of pixel shifts, then a given scene location 330 may be captured by the same type of infrared sensor 230A or 230B in blocks 710 and 730. In such a case, a radiometric value may only be available for one wavelength range. In various embodiments, such radiometric values may be discarded, collected for background data, added to partially populate radiometric scene map 310, and/or used for other processing.

As discussed with regard to block 630 of FIG. 6, additional operations may be performed.

Accordingly, FIG. 8 illustrates a process of performing gas detection and quantification in accordance with an embodiment of the disclosure. For example, in some embodiments, the process of FIG. 8 may be performed during block 630 of FIG. 6.

In block 810, system 100 receives infrared radiation 171 from scene 170. As discussed, infrared radiation 171 may include wavelengths that are emitted and/or absorbed by gas 172 within scene 170, and other wavelengths that are emitted and/or absorbed by background portion 173 of scene 170 including background object 175. Infrared radiation 171 passes through aperture 134 and optical components 132 which cause infrared radiation 171 to be directed and focused toward sensor array 228 of image capture component 130.

In block 815, the temperature Tgas (e.g., air temperature) of gas 172 (e.g., the gas temperature is assumed to quickly reach thermal equilibrium with the air) and the temperature Tb of background portion 173 of scene 170 are received, for example, by measurements of one or more temperature sensors provided by sensing components 160 and/or by processing one or more captured images.

In block 820, infrared sensors 230A and 230B capture gas and no-gas images, respectively. As discussed, the wavelength ranges captured by infrared sensors 230A and 230B may be determined by the structure of infrared sensors 230A and 230B and/or one or more filters 133. The use of at least two differently configured sets of infrared sensors 230A and 230B in an alternating manner permits, in some embodiments, the gas and no-gas images to be physically-aligned with each other, and also time-aligned through simultaneous capture. In some embodiments, the signals associated with the captured images may be passed from infrared sensors 230A and 230B to ROIC 202 as current signals which are stored as voltages by capacitors of ROIC 202.

In block 825, ROIC 202 provides the gas and no-gas images (e.g., converted from stored voltages to digital counts) to image capture interface component 136, which provides them to processing component 110 over connections 141.

In block 830, processing component 110 calibrates the gas and no-gas images. In some embodiments, this may include calibrating the images against each other, performing radiometric calibrations on the images, and/or other processing. In some embodiments, this may include adjusting the gains of gas pixels and/or no-gas pixels of the images such that the overall pixel values (e.g., digital counts) are comparable to each other.

In some embodiments, the gas and no-gas images can be more effectively calibrated in block 830 due to the limited wavelength ranges associated with infrared sensors 230A and 230B as discussed. This calibration can significantly improve the quality of a differential image generated from the gas and no-gas images (e.g., providing greater contrast between gas 172 and background portion 173 to better distinguish between them in the differential image), which consequently provides more reliable quantification and more accurate alarms.

In block 835, processing component 110 generates a differential image based on the calibrated gas and no-gas images. For example, processing component 110 may subtract either of the captured images from the other. It will be understood that such subtraction may be performed accurately and with high confidence because the original gas and no-gas images may be captured in a spatially-aligned and time-aligned manner in accordance with the techniques discussed herein. The resulting differential image will therefore exhibit high contrast between its no-gas and gas portions for use in further processing as discussed herein.

In block 840, processing component 110 compares the gas band response evident in the differential image to one or more known gas band responses (e.g., stored in a database or other data structure maintained in machine readable medium 113 and/or memory component 120). In this regard, processing component 110 may determine whether the differential image exhibits significant absorption and/or emission patterns associated with one or more known gases in the database.

In block 845, the absolute temperature difference DT of the gas temperature Tgas and background temperature Tb is determined (e.g., DT=Tb−Tgas). Also in block 845, this difference DT is used to determine a gas concentration length, for example, using data from radiometric scene map 310 (e.g., stored in a database or other data structure maintained in machine readable medium 113 and/or memory component 120).

In block 850, processing component 110 identifies the particular gas 172 in scene 170 based on the comparison of block 840.

In block 855, processing component 110 performs gas quantification processing based on the concentration length determined in block 842, the differential image, one or more of the captured gas and no-gas images, and/or radiometric scene map 310. In various embodiments, such processing may include, for example, generation and analysis of one or more concentration length (CL) images, gas flow calculations, and/or other operations. As discussed, by providing radiometric scene map 310 with two radiometric values in different wavelength ranges for background portion 173 in various scene locations 330, gas concentration can be more readily discerned and distinguished from the background portion 173.

In block 860, processing component 100 generates one or more alarms in response to the identification and/or quantification of blocks 850 and/or 855. For example, in various embodiments, such alarms may be communicated to a user through display component 140, communication component 152, and/or other components using various media such as text, graphics, audio signals, and/or other ways as appropriate.

In some embodiments, the use of infrared sensors 230A and 230B with different response characteristics permit the differential image to exhibit increased contrast between gas 172 and background portion 173. Such increased contrast (e.g., through further separation of gas 172 from background portion 173 in the differential image) can permit processing component 110 to better distinguish between gas 172 and background portion 173 in the differential image, thus improving the accuracy of the gas identification of block 850, the gas quantification of block 855, and/or the alarm generation of block 860 (e.g., reduced false alarm rates).

In block 865, processing component 110 applies coloring to the differential image to provide a user viewable image. In block 870, processing component 110 provides the user viewable image to display component 140 for display and/or further manipulation by a user of system 100.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
receiving infrared radiation from a scene at a sensor array comprising first and second sets of infrared sensors associated with first and second wavelength ranges of the infrared radiation, respectively;
capturing a first image of the scene by the first set of infrared sensors;
detecting a background object in the first image;
capturing a second image of the scene by the second set of infrared sensors with the background object in a shifted position relative to the first image;
tracking the background object to identify the background object in the second image to determine first and second radiometric values corresponding to the first and second wavelength ranges have been captured for the background object;
updating a radiometric scene map with the first and second radiometric values associated with the first and second images and correlated to a location of the background object in the scene; and
performing gas quantification using the radiometric scene map.

2. The method of claim 1, further comprising receiving a force at the sensor array between the capturing of the first and second images to shift the position of the background object in the second image relative to the first image.

3. The method of claim 2, wherein:
the method is performed by a handheld thermal camera; and
the force is caused by a user while holding the camera.

4. The method of claim 2, further comprising operating an actuator to provide the force to the sensor array.

5. The method of claim 2, wherein the shift corresponds to a shift of an odd number of pixels of the second image relative to pixels of the first image.

6. The method of claim 1, further comprising repeating the receiving through the updating for a plurality of background objects to update the radiometric scene map with radiometric values correlated to a plurality of locations of the background objects in the scene prior to performing the gas quantification.

7. The method of claim 1, wherein:
the first wavelength range is associated with a gas band of a gas of interest; and
the second wavelength range is associated with a no-gas band.

8. The method of claim 1, wherein the first and second sets of infrared sensors are arranged in an alternating checkerboard pattern or an alternating column pattern.

9. The method of claim 1, further comprising:
performing background object detection to detect a gas plume in at least one of the images; and
refraining from updating the radiometric scene map for a location of the gas plume in the scene.

10. The method of claim 1, further comprising:
capturing third and fourth images by the first and second sets of infrared sensors, respectively; and
processing the third and fourth images to detect a gas in the scene prior to performing the gas quantification.

11. A system comprising:
a sensor array configured to receive infrared radiation from a scene, the sensor array comprising:
a first set of infrared sensors configured to capture a first image associated with a first wavelength range of the infrared radiation, and
a second set of infrared sensors configured to capture a second image associated with a second wavelength range of the infrared radiation and with the background object in a shifted position relative to the first image; and a processor configured to:
detect a background object in the first image,
track the background object to identify the background object in the second image to determine first and second radiometric values corresponding to the first and second wavelength ranges have been captured for the background object,
update a radiometric scene map with the first and second radiometric values associated with the first and second images and correlated to a location of the background object in the scene, and
perform gas quantification using the radiometric scene map.

12. The system of claim 11, wherein the sensor array is configured to receive a force between the capture of the first and second images to shift the position of the background object in the second image relative to the first image.

13. The system of claim 12, wherein:
the system is a handheld thermal camera; and
the force is caused by a user while holding the camera.

14. The system of claim 12, further comprising an actuator configured to provide the force to the sensor array.

15. The system of claim 12, wherein the shift corresponds to a shift of an odd number of pixels of the second image relative to pixels of the first image.

16. The system of claim 11, wherein the processor is configured to update the radiometric scene map with radiometric values correlated to a plurality of locations of background objects in the scene prior to the gas quantification.

17. The system of claim 11, wherein:
the first wavelength range is associated with a gas band of a gas of interest; and
the second wavelength range is associated with a no-gas band.

18. The system of claim 11, wherein the first and second sets of infrared sensors are arranged in an alternating checkerboard pattern or an alternating column pattern.

19. The system of claim 11, wherein the processor is configured to:
  perform background object detection to detect a gas plume in at least one of the images; and
  refrain from updating the radiometric scene map for a location of the gas plume in the scene.

20. The system of claim 11, wherein the processor is configured to process third and fourth images captured by the first and second sets of infrared sensors, respectively, to detect a gas in the scene prior to the gas quantification.

* * * * *